United States Patent
Sheldon et al.

(10) Patent No.: US 7,707,838 B2
(45) Date of Patent: May 4, 2010

(54) AUXILIARY POWER UNIT ASSEMBLY

(75) Inventors: Karl Edward Sheldon, Rexford, NY (US); Charles Erklin Seeley, Niskayuna, NY (US); Ludwig Christian Haber, Rensselaer, NY (US)

(73) Assignee: General Electric Company, Schenectady, NY (US)

( * ) Notice: Subject to any disclaimer, the term of this patent is extended or adjusted under 35 U.S.C. 154(b) by 549 days.

(21) Appl. No.: 11/590,114

(22) Filed: Oct. 31, 2006

(65) Prior Publication Data

US 2008/0098747 A1 May 1, 2008

(51) Int. Cl.
*F02C 6/04* (2006.01)
(52) U.S. Cl. ............................. 60/785; 60/39.83; 60/802
(58) Field of Classification Search ................... 60/782, 60/785, 39.83, 802, 772, 779, 39.091, 39.1; 244/58; 62/DIG. 5; 454/71, 76
See application file for complete search history.

(56) References Cited

U.S. PATENT DOCUMENTS

| | | | | |
|---|---|---|---|---|
| 4,060,980 A | * | 12/1977 | Elsaesser et al. | 60/773 |
| 4,118,926 A | * | 10/1978 | Curvino et al. | 60/778 |
| 4,261,416 A | * | 4/1981 | Hamamoto | 165/271 |
| 4,419,926 A | * | 12/1983 | Cronin et al. | 454/74 |
| 4,684,081 A | * | 8/1987 | Cronin | 244/58 |
| RE34,388 E | * | 9/1993 | Dubin et al. | 60/779 |
| 5,442,905 A | * | 8/1995 | Claeys et al. | 60/785 |
| 5,899,085 A | * | 5/1999 | Williams | 62/236 |
| 5,956,960 A | * | 9/1999 | Niggeman | 62/172 |
| 5,967,461 A | * | 10/1999 | Farrington | 244/118.5 |
| 6,216,981 B1 | * | 4/2001 | Helm | 244/118.5 |
| 6,283,410 B1 | * | 9/2001 | Thompson | 244/58 |
| 6,305,156 B1 | * | 10/2001 | Lui | 60/785 |
| 6,834,831 B2 | * | 12/2004 | Daggett | 244/58 |
| 2004/0144096 A1 | * | 7/2004 | Wollenweber | 60/772 |
| 2007/0220900 A1 | * | 9/2007 | Shockling et al. | 60/802 |
| 2007/0234731 A1 | * | 10/2007 | Sheldon et al. | 60/772 |
| 2008/0098747 A1 | * | 5/2008 | Sheldon et al. | 60/802 |

* cited by examiner

*Primary Examiner*—William H Rodríguez
(74) *Attorney, Agent, or Firm*—William Scott Andes; General Electric Company

(57) ABSTRACT

An embodiment of the technology described herein is an auxiliary power unit assembly. The auxiliary power unit assembly includes an auxiliary power unit being installable in an aircraft having a cabin, a duct connecting the cabin and the auxiliary power unit, and an airflow management feature in the duct.

5 Claims, 6 Drawing Sheets

AUXILIARY POWER UNIT ASSEMBLY

BACKGROUND OF THE INVENTION

The technology described herein relates generally to an auxiliary power unit installable (or installed) in an aircraft, and more particularly to the management of airflow from the cabin of an aircraft to such an auxiliary power unit.

Auxiliary power units, frequently comprising gas turbine engines, are installed in some aircraft to provide mechanical shaft power to electrical and hydraulic equipment such as electrical power generators and alternators and hydraulic pumps, as opposed to the main engines which provide propulsion for the aircraft. The inlet of the compressor of such auxiliary gas turbine engines receives air from the atmosphere. Because the density of air decreases with increasing altitude, such auxiliary gas turbine engines, at increased altitude, must either work harder to produce a desired shaft power resulting in an increased operating temperature or must reduce the output shaft power to stay within an operating temperature limit.

Auxiliary power units, much like other types of equipment, also produce a certain amount of noise during operation. Such noise is often transmitted to an aircraft cabin to varying degrees both by the gas turbine engine or engines which propel the aircraft in flight as well as by the auxiliary power unit. Such noise can reach unacceptable levels, and even at modest levels can become objectionable in such a confined space over prolonged periods of time.

Known noise reduction systems include baffle mufflers often used for automobiles, Herschel Quincke tubes, and active noise canceling headphones which detect noise frequencies and emit such noise frequencies with an opposite phase. Piezoelectric materials are known wherein electricity applied to the materials produces dimensional changes in the materials.

Still, scientists and engineers continue to seek improved auxiliary power units for aircraft.

BRIEF DESCRIPTION OF THE INVENTION

An embodiment of the technology described herein is an auxiliary power unit assembly. The auxiliary power unit assembly includes an auxiliary power unit being installable in an aircraft having a cabin, a duct connecting the cabin and the auxiliary power unit, and an airflow management feature in the duct.

BRIEF DESCRIPTION OF THE DRAWINGS

The accompanying drawings illustrate several embodiments of the technology described herein, wherein.

DETAILED DESCRIPTION OF THE INVENTION

Figure 1:
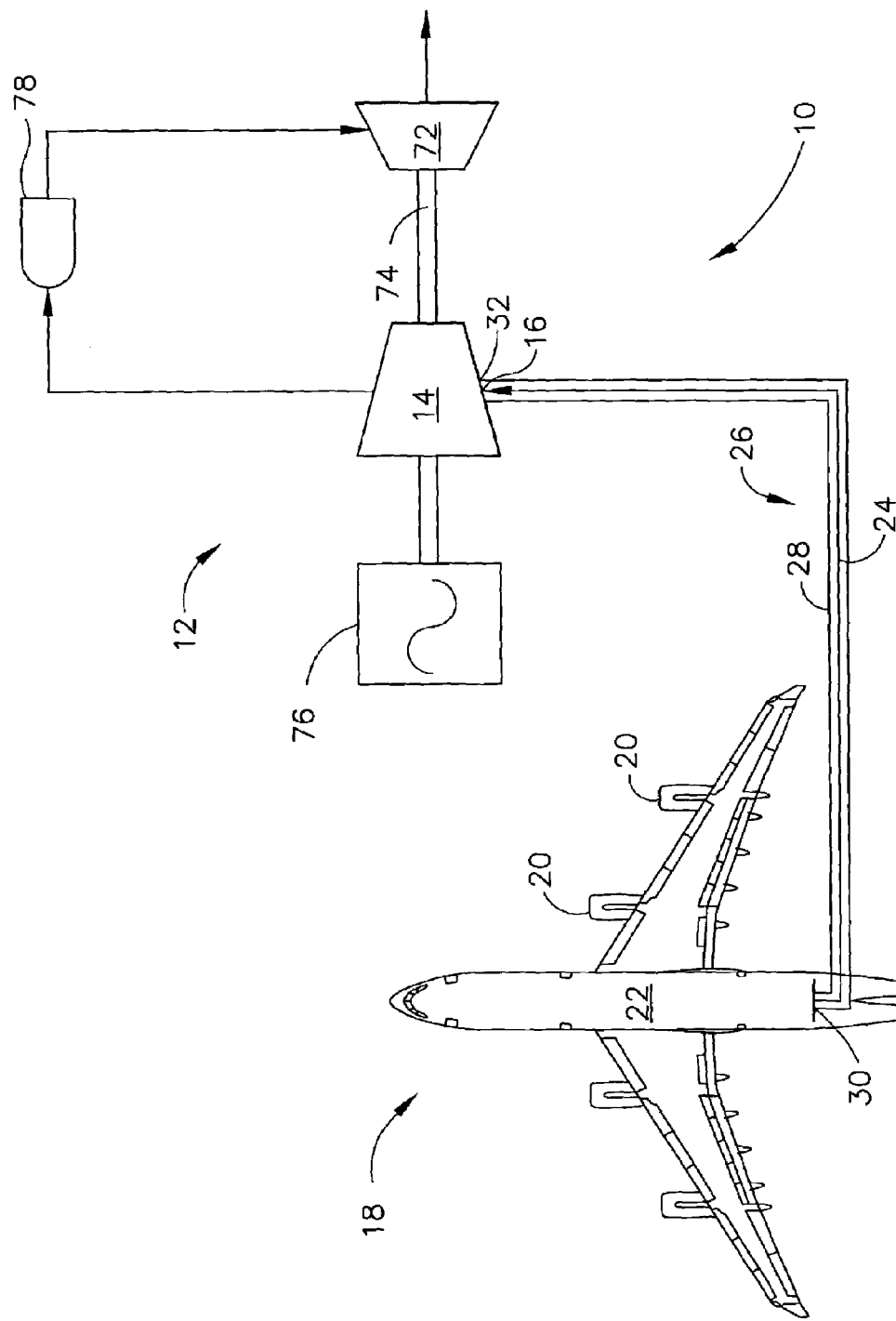
FIG. 1 is a schematic representation of an embodiment of an aircraft including an engine for propelling the aircraft, an auxiliary power unit (illustrated in the form of an auxiliary gas turbine engine), a first embodiment of a duct connecting the inlet of the compressor of the auxiliary gas turbine engine to the pressurized cabin of the aircraft, and an electrical generator rotated by the auxiliary gas turbine engine.
Figure 2:
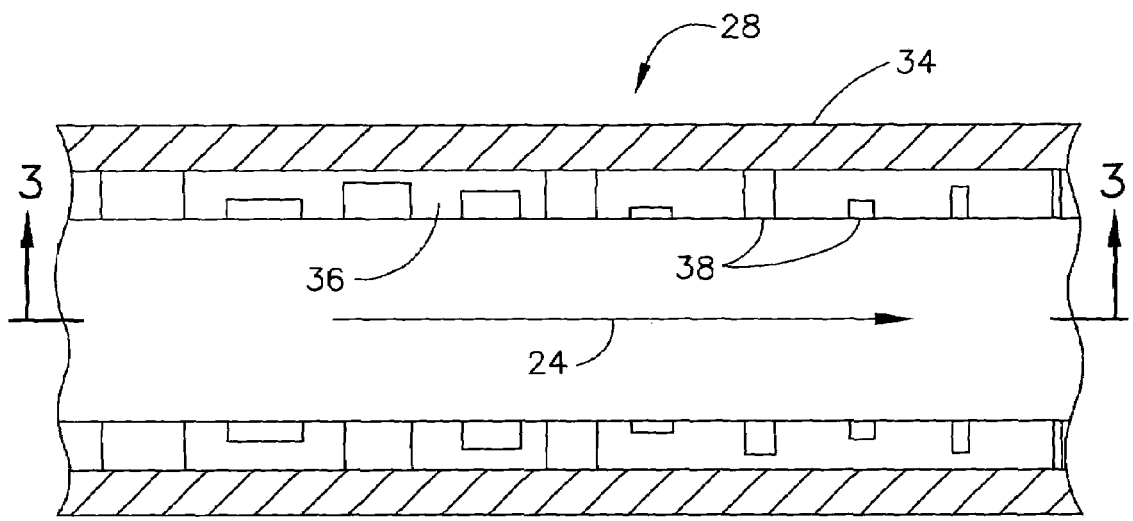
FIG. 2 is a cross sectional side view of a portion of the duct of FIG. 1 showing an acoustic liner within the duct for reducing noise within the cabin coming from the auxiliary power unit.
Figure 3:
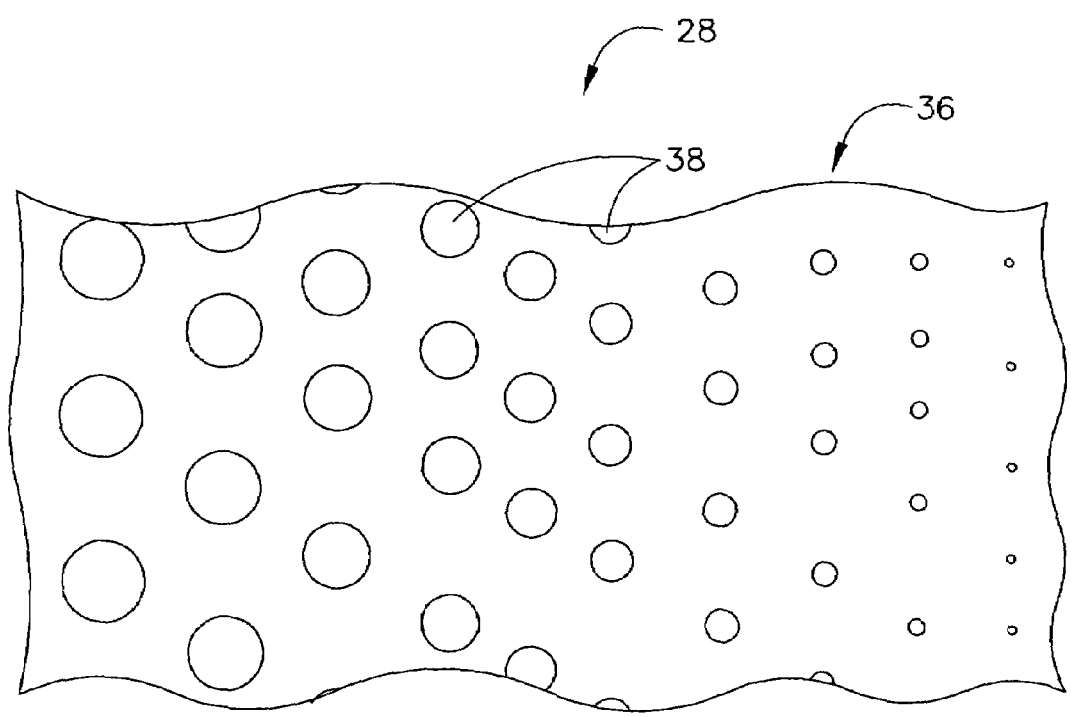
FIG. 3 is a view of the acoustic liner of FIG. 2 taken along lines 3-3 of FIG. 2.

Referring now to the drawings, FIGS. 1-3 disclose a first embodiment of the technology described herein. The embodiment of FIGS. 1-3 is for an auxiliary power unit assembly 10. The auxiliary power unit assembly 10 in the embodiment shown includes an auxiliary gas turbine engine 12. The auxiliary gas turbine engine 12 includes a compressor 14 having a compressor inlet 16. The auxiliary gas turbine engine 12 is installable (and in one example is installed) in an aircraft 18 having an engine 20 for propelling the aircraft and having a cabin 22. Engine 20 may be a gas turbine engine or any other suitable means of propulsion. The compressor inlet 16 is adapted to receive pressurized air 24 from the cabin 22. The auxiliary power unit assembly 10 also includes means for reducing noise within the cabin 22 coming from the auxiliary gas turbine engine 12, such as noise reduction feature 26. Noise reduction feature 26 is particularly adapted to reduce noise transmitted via duct 28 from the auxiliary power unit assembly 10 to the cabin 22. In one deployment of the auxiliary power unit assembly 10, which may employ any embodiment of the duct, the auxiliary gas turbine engine 12 includes a turbine 72 mechanically coupled to the compressor 14 by a shaft 74 and operatively connected to an electric generator 76, as shown in FIG. 1. In this deployment, the auxiliary gas turbine engine 12 also includes a combustor 78 operatively connected to the compressor 14 and to the turbine 72 as is well known in the art.

In one implementation of the embodiment of FIGS. 1-3, the auxiliary power unit assembly 10 also includes a duct 28 having an inlet 30 and an outlet 32. The inlet 30 of the duct 28 is adapted for fluid communication (and in one example is in fluid communication) with the pressurized air 24 from the cabin 22. The outlet 32 of the duct 28 is adapted for fluid communication (and in one example is in fluid communication) with the compressor inlet 16 of the compressor 14 of the auxiliary gas turbine engine 12. Accordingly, duct 28 comprises a connection between the cabin and the auxiliary power unit and provides a means for transmitting pressurized air from the cabin to the auxiliary power unit. In a first enablement, the duct 28 has an outer wall 34, and the noise reduction feature 26 includes an acoustic liner 36 disposed within, and attached to, the outer wall 34 of the duct 28, as shown in FIG.

2. In one variation, the acoustic liner 36 has a length and includes a plurality of holes 38 each having a diameter, and the diameter of the holes 38 varies along the length of the acoustic liner 36 to attenuate a plurality of different tonal frequencies of the noise, as illustrated in FIG. 3. Some holes 38 may fully penetrate the thickness of the acoustic liner 36, while other holes 38 may not. In one example, the tonal frequencies of the noise come from the compressor 14 of the auxiliary gas turbine engine 12. In one utilization, the cabin 22 houses people and/or cargo which are sensitive to excessive noise.

Figure 4:
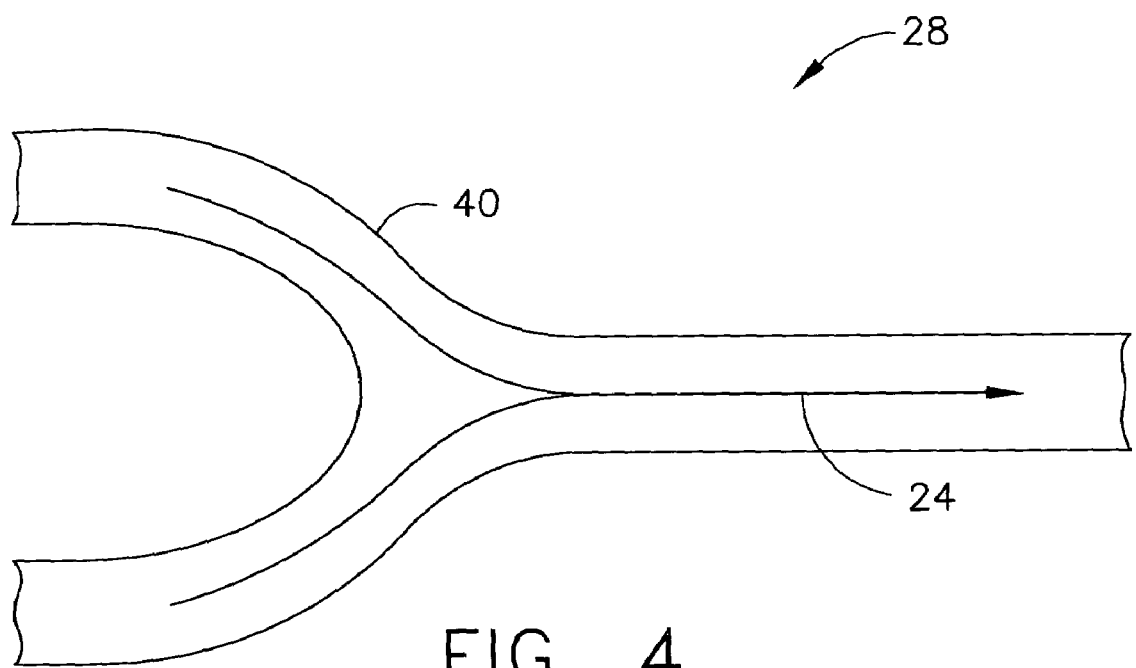
FIG. 4 is a schematic view of a second embodiment of the duct including a bifurcated inlet pipe section for reducing noise within the cabin coming from the auxiliary power unit.

In a second embodiment of the duct 28, as shown in FIG. 4, the duct 28 includes a noise reduction feature in the form of a bifurcated inlet pipe section 40. In one example, the bifurcated inlet pipe section 40 acts as a muffler to attenuate broadband noise within the cabin coming from the auxiliary gas turbine engine 12. It is noted that the bifurcated inlet pipe section 40 of FIG. 4 shows two inlet branches (which would be adapted for receiving, and in one example would receive, the pressurized air from the cabin), and that, in one configuration, not shown, the bifurcated inlet pipe section has at least one additional inlet branch, with the total number of inlet branches being selected to suit the particular installed configuration.

Figure 5:
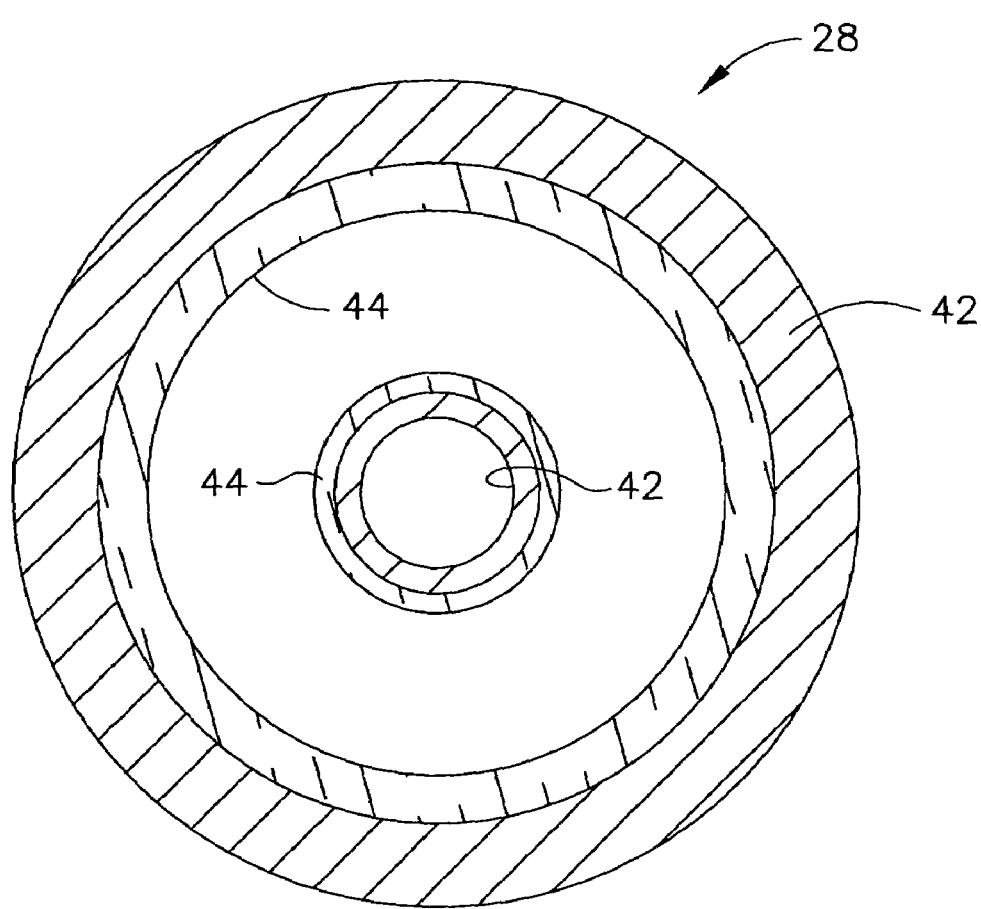
FIG. 5 is a cross sectional end view of a third embodiment of the duct including a plurality of concentric tubes.

In a third embodiment of the duct 28, as shown in FIG. 5, the duct 28 includes a noise reduction feature in the form of a plurality of concentric tubes 42. In one example, the plurality of concentric tubes 42 act as a muffler to attenuate broadband noise within the cabin coming from the auxiliary gas turbine engine. In one variation, the noise reduction feature also includes acoustic liners 44 disposed between, and attached to, radially adjacent ones of the concentric tubes 42.

Figure 6:
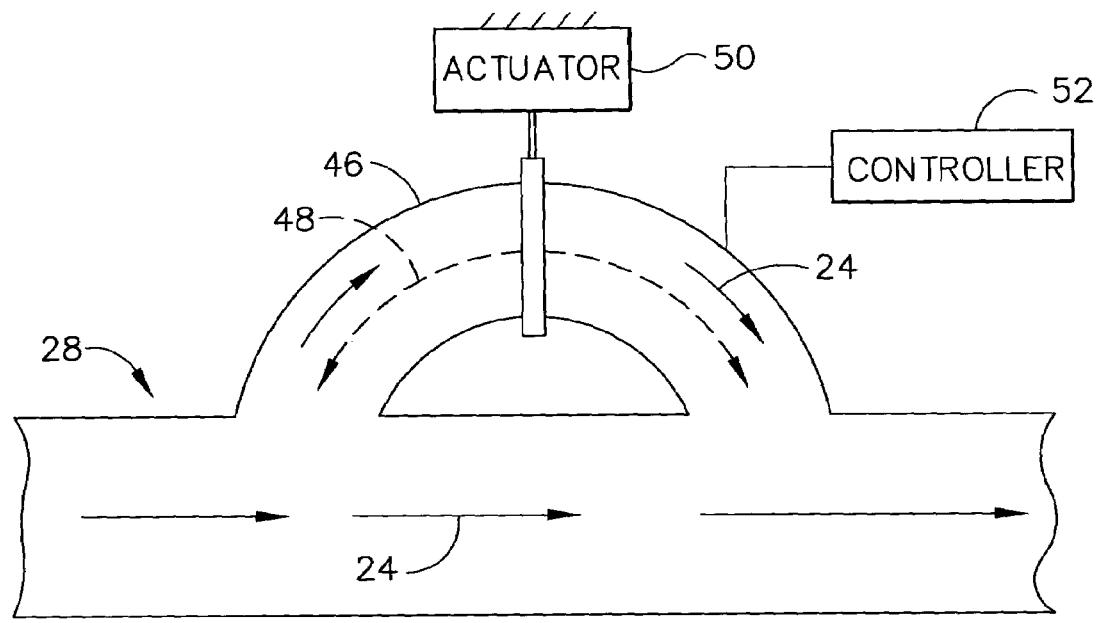
FIG. 6 is a schematic view of a fourth embodiment of the duct including a Herschel Quincke tube section.

In a fourth embodiment of the duct 28, as shown in FIG. 6, the duct 28 includes a noise reduction feature in the form of a Herschel Quincke tube section 46. In one example, the Herschel Quincke tube section 46 acts to attenuate a plurality of different tonal frequencies of noise depending on the path length 48 of the Herschel Quincke tube section 46, as is known to those skilled in the art. In one variation, the noise reduction feature also includes an actuator 50 operatively connected to the Herschel Quincke tube section 46 to change the geometry (such as the path length 48) of the Herschel Quincke tube section 46 (such as a flexible Herschel Quincke tube section 46, shown, or a telescoping Herschel Quincke tube section, not shown). It is noted that the term "geometry" includes shape and/or dimensions. In the same or a different variation, the Herschel Quincke tube section 46 comprises a piezoelectric material and has a geometry (resulting in a path length 48), and also including a controller 52 operatively connected to the piezoelectric material to supply electricity to the piezoelectric material to change the geometry (resulting in a change in the path length 48) of the Herschel Quincke tube section 46. In one modification, a control system (not shown) includes frequency detectors (not shown) for detecting tonal frequencies of the noise and includes the actuator 50 and/or the controller 52 to change the geometry of the Herschel Quincke tube section 46 to reduce such tonal noise. In such a configuration, the control system may provide a level of active control by monitoring tonal frequencies on a continuous or intermittent basis and automatically adjusting the geometry of the Herschel Quincke tube section 46.

Figure 7:
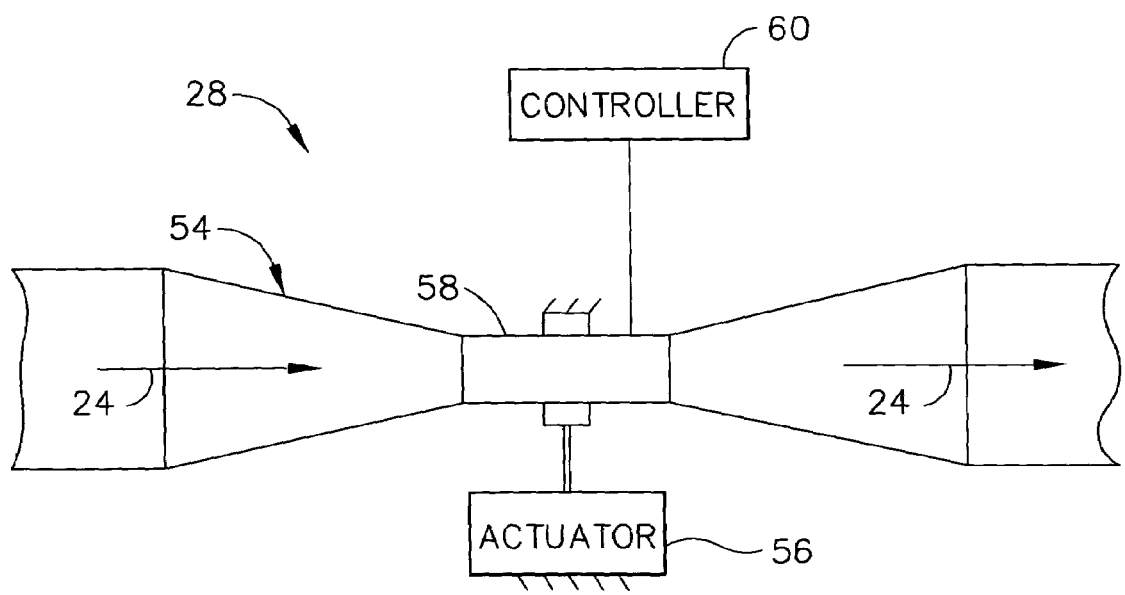
FIG. 7 is a schematic view of a fifth embodiment of the duct including a converging-diverging nozzle section.

In a fifth embodiment of the duct 28, as shown in FIG. 7, the duct 28 includes a noise reduction feature in the form of a converging-diverging nozzle section 54. In one example, the converging-diverging nozzle section 54 chokes, and therefore acoustically separates, the auxiliary power unit from the cabin. In one configuration, the converging-diverging nozzle section 54 has a shape of substantially a venturi tube. In one variation, the noise reduction feature also includes an actuator 56 operatively connected to the convergent-divergent nozzle section 54 to change the geometry (such as the diameter of the throat 58) of the converging-diverging nozzle section 54 (such as a flexible converging-diverging nozzle section 54, shown). In the same or a different variation, the converging-diverging nozzle section 54 comprises a piezoelectric material and has a geometry (resulting in a diameter of the neck 58), and also including a controller 60 operatively connected to the piezoelectric material to supply electricity to the piezoelectric material to change the geometry (resulting in a change in the diameter of the neck 58) of the converging-diverging nozzle section 54. In one modification, a control system (not shown) includes flow rate detectors (not shown) for detecting when the flow is choked. As discussed above, the system may also include a form of active control.

Figure 8:
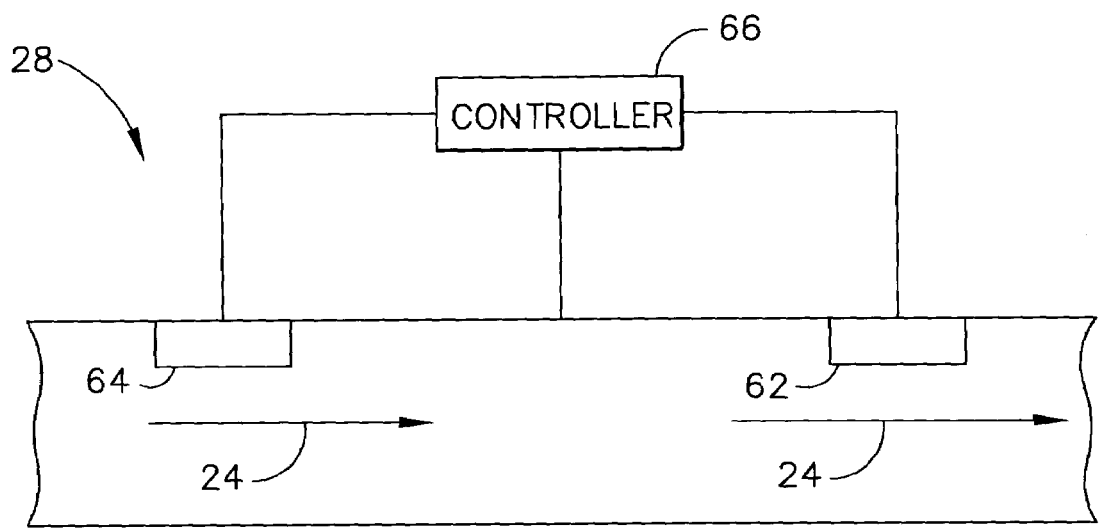
FIG. 8 is a schematic view of a sixth embodiment of the duct, wherein a noise frequency detector and a noise emitter are disposed in the duct, and wherein a noise-canceling controller receives an input signal from the noise frequency detector and sends an output signal to the noise emitter to actively cancel noise frequencies.

In a sixth embodiment of the duct 28, as shown in FIG. 8, the noise reduction feature also includes at least one noise detector 62 disposed downstream in the duct 28, at least one noise emitter 64 disposed upstream in the duct 28, and an active-noise-canceling controller 66 which receives an input signal from the at least one noise detector 62 and which sends an output signal to the at least one noise emitter 64.

Figure 9:
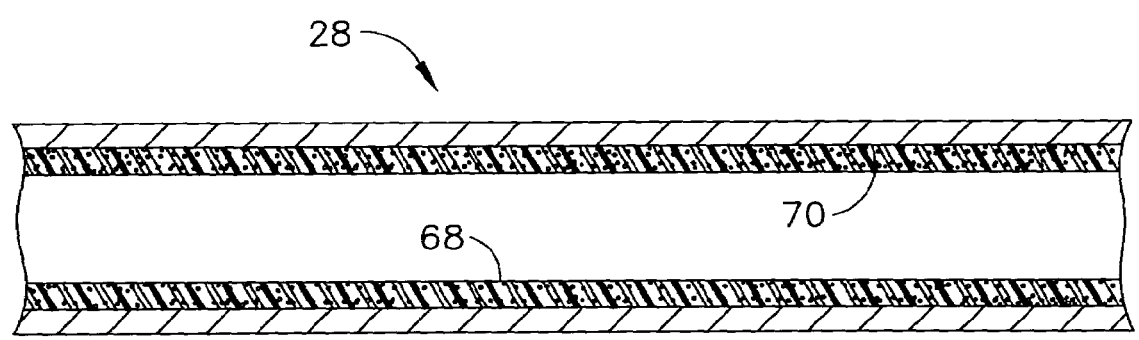
FIG. 9 is a schematic cross sectional view of a seventh embodiment of the duct including an acoustic gel disposed on a surface of the duct and adapted for contact with the pressurized air from the cabin.

In a seventh embodiment of the duct 28, as shown in FIG. 9, the noise reduction feature also includes an acoustic gel 68 disposed on a surface 70 of the duct 28 and adapted for contact with the pressurized air from the cabin.

With regard to the embodiments of FIGS. 6 and 7, a wide variety of piezoelectric materials are contemplated as suitable for use in such applications. Among other criteria, the choice of suitable materials will be influenced by the amount of authority, or ability to exert geometry-changing forces on the structure, that a particular piezoelectric material has. Among other types, matrix fiber composites having piezoelectric strands incorporated therein may be useful for such applications.

Figure 10:
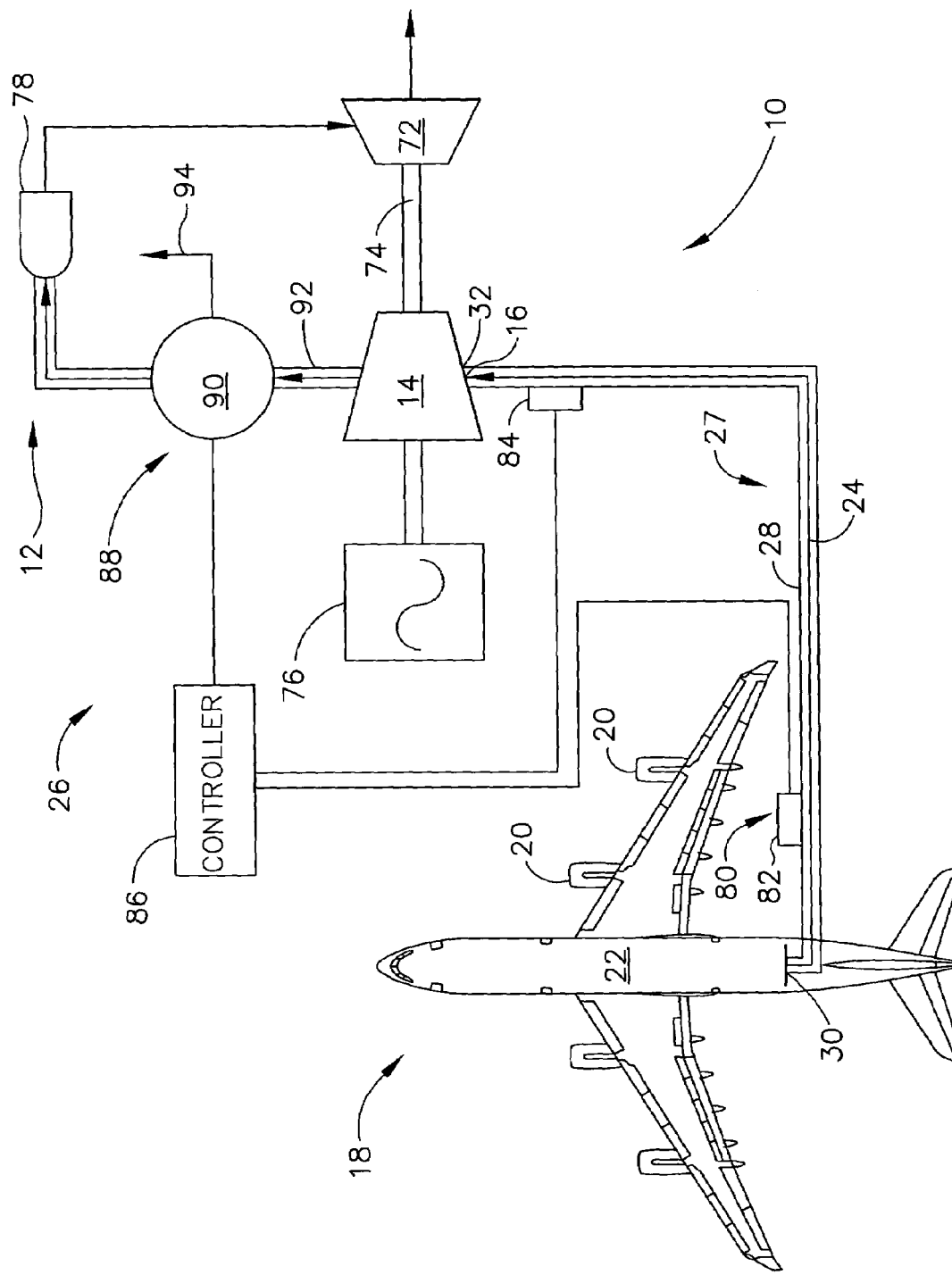
FIG. 10 is a schematic representation of an aircraft including an auxiliary power unit in the form of an auxiliary gas turbine engine and a stall-preventing means for preventing a stall of the compressor of the auxiliary gas turbine engine.

Referring again to the drawings, FIG. 10 discloses a second embodiment of the technology described herein. In FIG. 10, like numbered elements depict like elements as described herein with respect to the embodiment of FIG. 1.

In one implementation of the embodiment of FIG. 10, the auxiliary power unit assembly 10 takes the form of an auxiliary gas turbine engine 12. The auxiliary power unit assembly 10 also includes means for preventing a compressor stall in the auxiliary gas turbine engine 12, such as an airflow management feature which may take the form of stall prevention feature 27. Stall prevention feature 27 is an airflow management feature particularly adapted to manage airflow in duct 28 from the cabin 22 to the auxiliary power unit assembly 10, thereby comprising a means for managing airflow in duct 28.

In a first enablement of the embodiment of FIG. 10, the stall prevention feature 27 includes at least one stall sensor assembly 80. In one example, the at least one stall sensor assembly 80 includes an upstream pressure sensor 82 and a downstream pressure sensor 84. A controller 86 uses differential pressure measurements from the upstream and downstream pressure sensors 82 and 84 to predict an impending compressor stall. The controller 86 then commands a flow adjustor 88 to adjust the flow to avoid the compressor stall.

In a first example, the flow adjustor 88 includes a variable-area bleed valve 90 in the outlet duct 92 leading from the compressor 14 to the combustor 78. The variable-area bleed valve 90 is commanded by the controller 86 to release air 94 from the outlet duct 92 to the atmosphere to avoid a stall of the compressor 14 (from back flow to the cabin 22) or to avoid a surge of the compressor 14 (from a pressure spike from the cabin 22). In a second example, the outlet duct 92 is a variable-area outlet duct which is commanded by the controller 86 to change geometry (i.e., to change its flow area) to avoid a compressor stall or a compressor surge. Other examples are possible as well. More broadly described, in one deployment, the stall prevention feature includes at least one stall sensor assembly 80, a controller 86, and a flow adjustor 88 wherein the at least one stall sensor assembly 80 is disposed in the duct 28, and wherein the controller 86 is operatively connected to the at least one stall sensor assembly 80 and to the flow adjustor 88.

In one extension of the first expression of the embodiment of FIG. 10, the auxiliary gas turbine engine assembly 10 also including means for reducing noise within the cabin coming from the auxiliary gas turbine engine. It is noted that such means includes the noise reduction feature 26 previously described in reference to the embodiments of FIGS. 1-9.

While the present invention has been illustrated by a description of several embodiments, it is not the intention of the applicants to restrict or limit the spirit and scope of the appended claims to such detail. Numerous other variations, changes, and substitutions will occur to those skilled in the art without departing from the scope of the invention.

The invention claimed is:

1. An auxiliary power unit assembly comprising:
    a) an auxiliary power unit, said auxiliary power unit being installable in an aircraft having a cabin;
    b) a duct connecting said cabin and said auxiliary power unit; and
    c) an airflow management feature in said duct;
    wherein said auxiliary power unit further comprises a gas turbine engine having a compressor and a stall prevention feature; and
    wherein said stall prevention feature further comprises at least one stall sensor assembly, a controller, and a flow adjustor, wherein said at least one stall sensor assembly is disposed in said duct, and wherein said controller is operatively connected to said at least one stall sensor assembly and to said flow adjustor.

2. The auxiliary power unit assembly of claim 1, wherein said duct further comprises an inlet adapted for fluid communication with said cabin and an outlet adapted for fluid communication with said compressor.

3. The auxiliary power unit assembly of claim 1, wherein said at least one stall sensor assembly further comprises an upstream pressure sensor and a downstream pressure sensor.

4. The auxiliary power unit assembly of claim 1, wherein said flow adjustor further comprises a variable-area bleed valve.

5. The auxiliary power unit assembly of claim 1, wherein said duct further comprises a variable-area outlet duct which is commanded by said controller to change geometry.

* * * * *